United States Patent
Ye et al.

(10) Patent No.: US 11,038,711 B2
(45) Date of Patent: Jun. 15, 2021

(54) SEPARATING CONTROL PLANE FUNCTION AND FORWARDING PLANE FUNCTION OF BROADBAND REMOTE ACCESS SERVER

(71) Applicant: NEW H3C TECHNOLOGIES CO., LTD., Hangzhou (CN)

(72) Inventors: Jinrong Ye, Beijing (CN); Yuanxiang Qiu, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 0 days.

(21) Appl. No.: 16/329,182

(22) PCT Filed: Aug. 30, 2017

(86) PCT No.: PCT/CN2017/099723
§ 371 (c)(1),
(2) Date: Feb. 27, 2019

(87) PCT Pub. No.: WO2018/041152
PCT Pub. Date: Mar. 8, 2018

(65) Prior Publication Data
US 2019/0222434 A1 Jul. 18, 2019

(30) Foreign Application Priority Data
Aug. 30, 2016 (CN) .......................... 201610778902.7

(51) Int. Cl.
*H04L 12/28* (2006.01)
*H04L 12/46* (2006.01)
(Continued)

(52) U.S. Cl.
CPC .......... *H04L 12/287* (2013.01); *H04L 12/185* (2013.01); *H04L 12/28* (2013.01);
(Continued)

(58) Field of Classification Search
CPC ............. H04L 12/4641; H04L 61/2015; H04L 12/4625; H04L 12/4633; H04L 12/2856; H04L 12/287; H04B 1/0003; H04W 12/06

See application file for complete search history.

(56) References Cited

U.S. PATENT DOCUMENTS 8,339,959 B1   12/2012 Moisand et al.
2008/0291906 A1* 11/2008 Chigurupati ............ H04L 45/00
                                                            370/356
(Continued)

FOREIGN PATENT DOCUMENTS

CN   101123549 A   2/2008
CN   101212398 A   7/2008
(Continued)

OTHER PUBLICATIONS

ISA State Intellectual Property Office of the People's Republic of China, International Search Report Issued in Application No. PCT/CN2017/099723, dated Dec. 6, 2017, WIPO, 4 pages.
(Continued)

*Primary Examiner* — Omer S Mian
(74) *Attorney, Agent, or Firm* — McCoy Russell LLP

(57) ABSTRACT

A server may receive an authentication packet from a Forwarder via a data channel. Where, the server enables a BRAS control plane function and the Forwarder enables a BRAS forwarding plane function. The server authenticates the authentication packet. When the authentication is successful, a session entry for instructing the Forwarder to forward a data packet is created, and the session entry and an identity of the data channel are transmitted to the Forwarder through a protocol connection paired with the data channel.

13 Claims, 5 Drawing Sheets

(51) Int. Cl.
  *H04L 29/06* (2006.01)
  *H04L 29/12* (2006.01)
  *H04W 12/06* (2021.01)
  *H04L 12/18* (2006.01)
  *H04L 29/08* (2006.01)
  *H04L 12/937* (2013.01)
  *H04L 12/717* (2013.01)

(52) U.S. Cl.
  CPC ...... *H04L 12/4633* (2013.01); *H04L 12/4641* (2013.01); *H04L 29/08* (2013.01); *H04L 49/253* (2013.01); *H04L 61/103* (2013.01); *H04L 61/2015* (2013.01); *H04L 63/08* (2013.01); *H04L 67/141* (2013.01); *H04W 12/06* (2013.01); *H04L 45/42* (2013.01)

(56) References Cited

U.S. PATENT DOCUMENTS

| | | | |
|---|---|---|---|
| 2010/0195666 A1 | 8/2010 | Adamczyk et al. | |
| 2012/0173661 A1 | 7/2012 | Mahaffey et al. | |
| 2013/0265941 A1 | 10/2013 | Chang et al. | |
| 2015/0200938 A1 | 7/2015 | Zhang et al. | |
| 2015/0244590 A1 | 8/2015 | Lin et al. | |
| 2016/0191421 A1* | 6/2016 | Tsuji | H04L 12/6418 370/392 |
| 2018/0331921 A1* | 11/2018 | Lin | H04L 49/00 |
| 2019/0013968 A1* | 1/2019 | Xie | H04L 12/4641 |

FOREIGN PATENT DOCUMENTS

| | | |
|---|---|---|
| CN | 101252535 A | 8/2008 |
| CN | 101257420 A | 9/2008 |
| CN | 102984223 A | 3/2013 |
| CN | 103731929 A | 4/2014 |
| CN | 104883687 A | 9/2015 |
| CN | 105337819 A | 2/2016 |
| CN | 105592047 A | 5/2016 |
| CN | 105763385 A | 7/2016 |
| CN | 105763416 A | 7/2016 |
| JP | 2010532116 A | 9/2010 |
| JP | 2012080418 A | 4/2012 |
| JP | 2014127866 A | 7/2014 |
| JP | 2015035729 A | 2/2015 |
| KR | 20140073156 A | 6/2014 |
| WO | 2015039699 A1 | 3/2015 |

OTHER PUBLICATIONS

ISA State Intellectual Property Office of the People's Republic of China, Written Opinion of the International Searching Authority Issued in Application No. PCT/CN2017/099723, dated Dec. 6, 2017, WIPO, 4 pages.

European Patent Office, Extended European Search Report Issued in Application No. 17845454.2, dated May 29, 2019, Germany, 8 pages.

State Intellectual Property Office of the People's Republic of China, Office Action and Search Report Issued in Application No. 201610778902.7, dated Jul. 1, 2019, 10 pages (Submitted with Partial Translation).

Japanese Patent Office Action, Office Action Issued in Application No. 2019-511733, dated Jan. 7, 2020, 3 pages. (Submitted with Machine Translation) X.

European Patent Office, Office Action Issued in Application No. 17845454.2, Mar. 22, 2021, Germany, 7 pages.

* cited by examiner

SEPARATING CONTROL PLANE FUNCTION AND FORWARDING PLANE FUNCTION OF BROADBAND REMOTE ACCESS SERVER

CROSS REFERENCE TO RELATED APPLICATIONS

This present application is a U.S. National Phase of International Patent Application Serial No. PCT/CN2017/099723 entitled "SEPARATION OF CONTROL PLANE FUNCTION AND FORWARDING PLANE FUNCTION OF BROADBAND REMOTE ACCESS SERVER," filed on Aug. 30, 2017. International Patent Application Serial No. PCT/CN2017/099723 claims priority to Chinese Patent Application No. 201610778902.7 filed on Aug. 30, 2016. The entire contents of each of the above-listed applications are hereby incorporated by reference for all purposes.

BACKGROUND

A Broadband Remote Access Server (BRAS) is an access gateway oriented to a broadband network application, which is a bridge between a broadband access network and a backbone network to provide an access management function.

The BRAS, as a software-hardware integrated special device, is a network device in which a control plane and a forwarding plane are closely coupled. In service application, there may be a problem of uncoordinated resources of the forwarding plane and the control plane on the BRAS. For example, in a case of sufficient hardware forwarding entry resources on the forwarding plane, a memory of the control plane is insufficient.

DETAILED DESCRIPTION OF THE EMBODIMENTS

The technical solutions of embodiments of the present disclosure will be described clearly and fully below in combination with drawings in the embodiments of the present disclosure. It is apparent that the described embodiments are merely part of embodiments of the present disclosure rather than all embodiments. Other embodiments achieved by those of ordinary skill in the art based on the embodiments in the present disclosure without paying creative work shall all fall into the scope of protection of the present disclosure.

In the present disclosure, a control plane function and a forwarding plane function of a BRAS are separated, where the control plane function may be deployed in a server in a network, such as a general-purpose x86 server, and the forwarding plane function may be deployed in a network device. As an example, because entries involved in the BRAS forwarding plane function may be different from entries supported by an existing physical device in the network, to avoid improving the existing physical device in the network, a special physical device may be newly added in the network to implement the BRAS forwarding plane function in the present disclosure.

Figure 1:
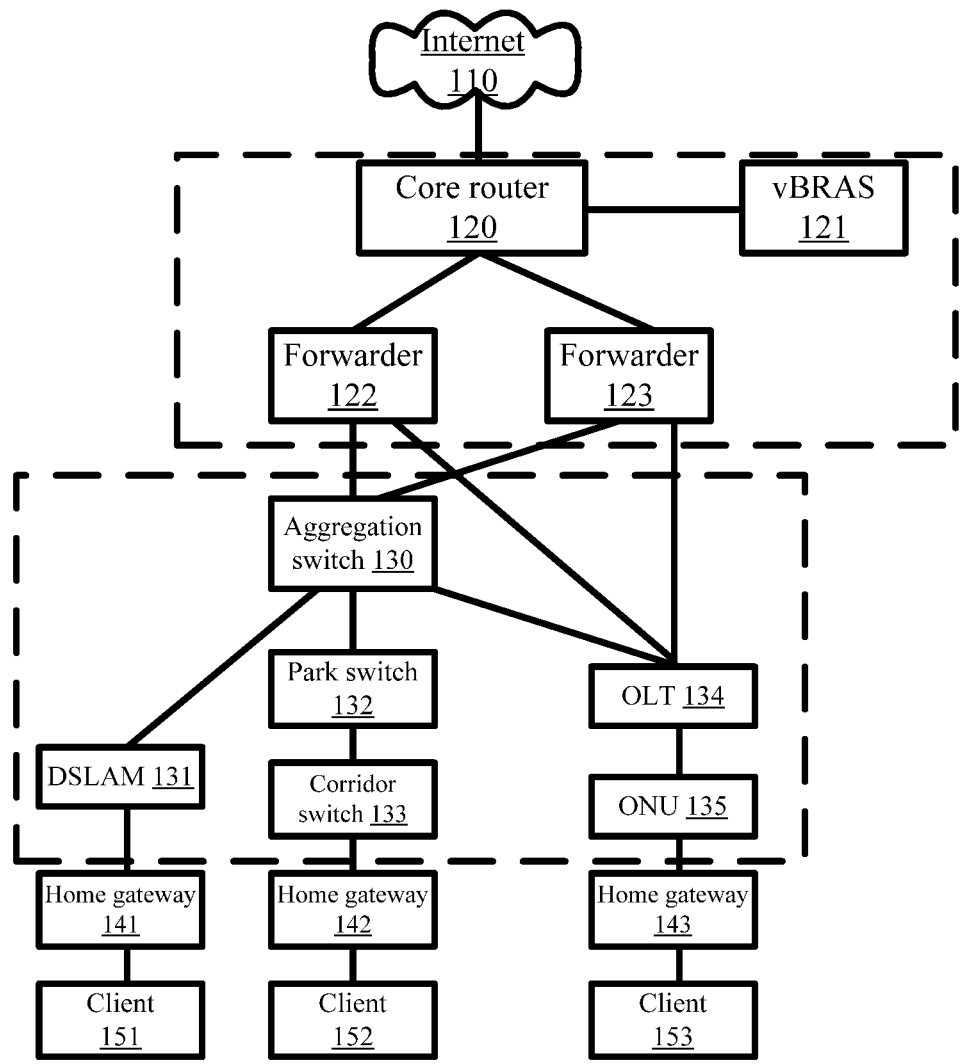
FIG. 1 illustrates an architecture diagram of a network to which a virtual BRAS (hereinafter referred to as vBRAS) and a Forwarder belong according to an example of the present disclosure.

For convenience of description, in the present disclosure, an entity on a server for implementing a control plane function of a BRAS may be called a virtual BRAS (hereinafter referred to as vBRAS). A network device for implementing a forwarding plane function of the BRAS may be called a Forwarder. FIG. 1 illustrates an architecture of a network to which the vBRAS and the Forwarder belong. The network architecture includes clients 151, 152 and 153, home gateways 141, 142 and 143, a Digital Subscriber Line Access Multiplexer (DSLAM) 131, a park switch 132, a corridor switch 133, an Optical Line Terminal (OLT) 134, an Optical Network Unit (ONU) 135, a aggregation switch 130, Forwarders 122 and 123, a vBRAS 121, a core router 120, and an Internet 110. A connection relationship of various components in the network architecture may be as shown in FIG. 1.

In the present disclosure, the vBRAS is deployed with the BRAS control plane function, and thus can achieve the processing of the BRAS control plane, such as authentication for a user getting online, interaction with an authentication server/charging server (Remote Authentication Dial In User Service (RADIUS) server) and so on.

The Forwarder is deployed with the BRAS forwarding plane function, and thus can achieve the processing of the BRAS forwarding plane, such as forwarding a packet and so on.

In the present disclosure, since the BRAS control plane function and the BRAS forwarding plane function are deployed on different devices, respectively, the first problem to be solved by the present disclosure is: an interaction between the vBRAS deployed with the BRAS control plane function and the Forwarder deployed with the BRAS forwarding plane function.

Figure 2:
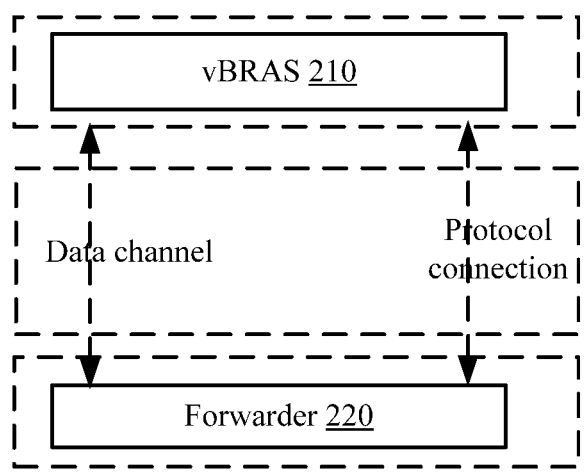
FIG. 2 illustrates a schematic diagram of an interaction between a vBRAS and a Forwarder according to an example of the present disclosure.

To achieve the interaction between the vBRAS and the Forwarder, in the present disclosure, a bidirectional data channel and a reliable communication protocol connection (hereinafter referred to as protocol connection) are deployed between the vBRAS and the Forwarder. Here, the data channel and the protocol connection may be paired, which is called a pair. FIG. 2 illustrates a schematic diagram of an interaction between a vBRAS 210 and a Forwarder 220. It is noted that the protocol connection may be based on a private protocol, and may also be based on an existing standard protocol, such as Openflow and Border Gateway Protocol (BGP) extensions, which is not limited hereto in the present disclosure.

Where, the data channel may be a data tunnel, such as a Virtual eXtensible Local Area Network (VXLAN) tunnel and so on. In the present disclosure, the data channel may be used to transmit packets between the vBRAS and the Forwarder. The transmitted packets may be a protocol packet, a data packet, etc.

In the present application, the Forwarder transmits a packet to the vBRAS via the data channel deployed between the Forwarder and the vBRAS. In an example, a forwarding chip of the Forwarder may redirect the packet to the data channel, thereby avoiding the packet from being processed by a Central Processing Unit (CPU) of the Forwarder and reducing consumption of the CPU. In another example, when the forwarding chip of the Forwarder is out of work, the CPU of the Forwarder may forward the packet via the data channel.

In the present disclosure, the vBRAS sends a session entry to the Forwarder through the protocol connection deployed between the vBRAS and the Forwarder. Compared with sending the session entry via the data channel, higher reliability may be achieved.

Based on the above description, a method of separating a control plane function and a forwarding plane function of a BRAS provided in the present disclosure will be described below.

Figure 3:
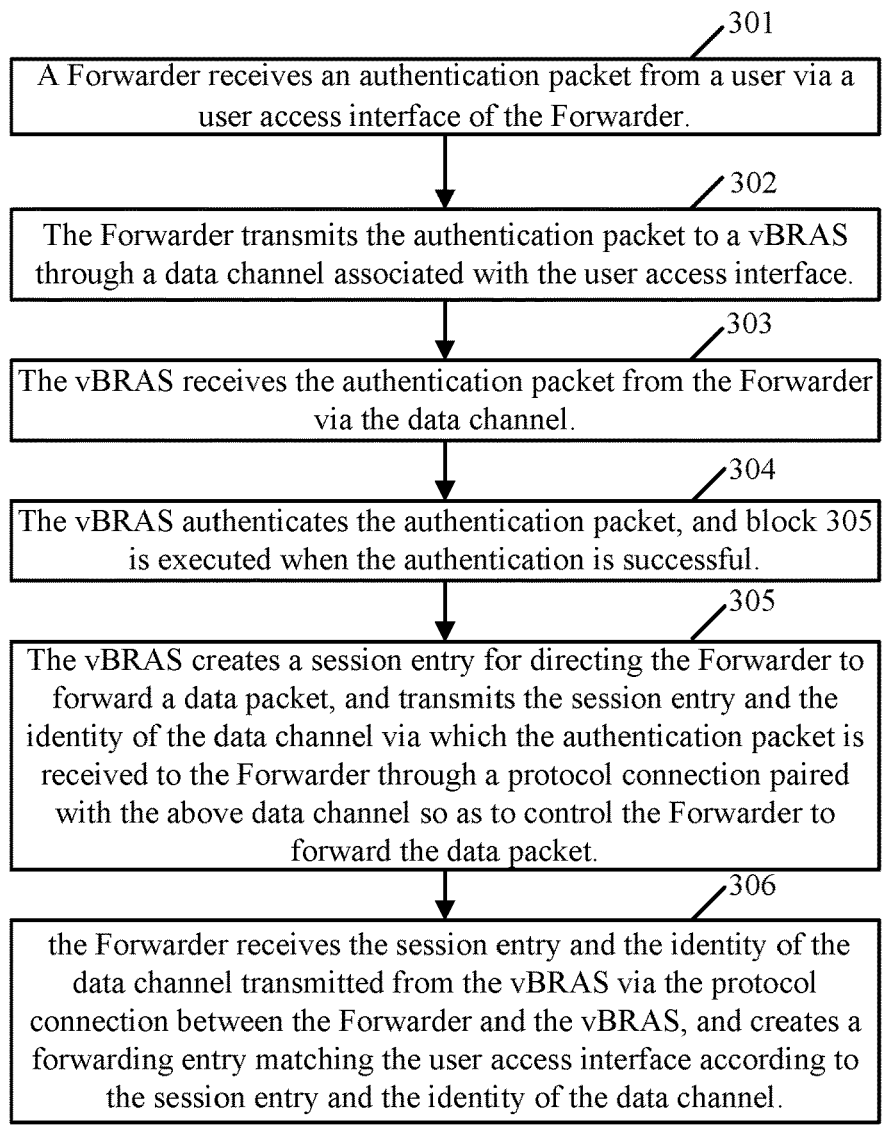
FIG. 3 illustrates a flowchart of a method of separating a control plane function and a forwarding plane function of a BRAS according to an example of the present disclosure.

FIG. 3 is a flowchart of a method of separating a control plane function and a forwarding plane function of a BRAS according to an example of the present disclosure. As shown in FIG. 3, the method may include blocks 301-306 as below.

At block 301, a Forwarder receives an authentication packet from a user via a user access interface of the Forwarder.

As described above, the authentication packet may be a protocol packet, and may also be a data packet, which is not specifically limited herein.

In the present disclosure, the user access interface may refer to an interface accessing a user device. The Forwarder may have at least one user access interfaces.

At block 302, the Forwarder transmits the authentication packet to a vBRAS via a data channel associated with the user access interface.

Figure 4:
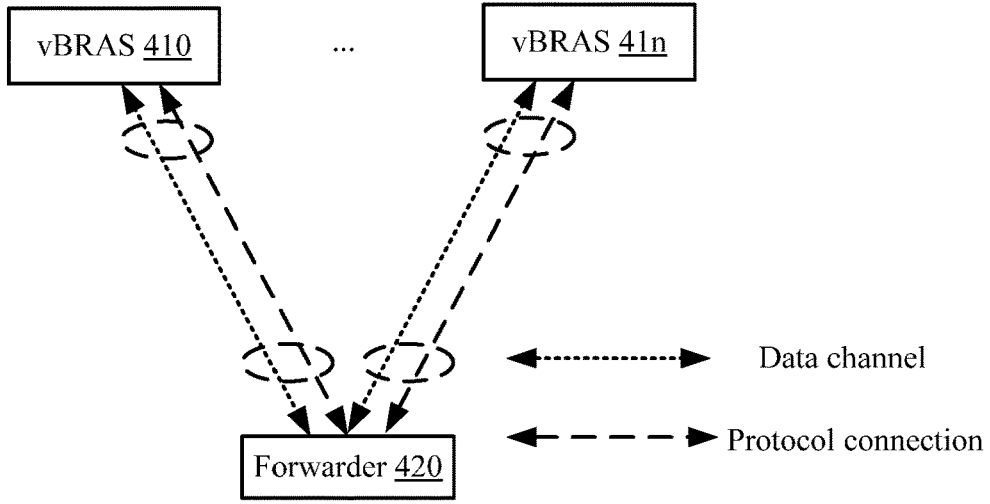
FIG. 4 illustrates a schematic diagram of a vBRAS and a Forwarder according to an example of the present disclosure.

In the present disclosure, a plurality of vBRASs may be allowed to control one Forwarder. FIG. 4 illustrates a schematic diagram of a vBRAS and a Forwarder according to an example of the present disclosure. As shown in FIG. 4, under a precondition that a plurality of vBRASs control one Forwarder, for example, a vBRAS 411, . . . , and a vBRAS 41$n$ control a Forwarder 420, where n is an integer greater than 1, Forwarder 420 may establish a data channel and a protocol connection with each of the vBRASs 411-41$n$ to achieve an interaction between Forwarder 420 and each of the vBRASs 411-41$n$. Where the data channel and the protocol connection between the Forwarder 420 and each of the vBRASs may be referred to as a pair. The Forwarder 420 may record each pair.

In the present disclosure, a user access interface of the Forwarder may be associated with a data channel in the recorded pairs. For example, identities of different user access interfaces of the Forwarder are Port0_1, Port0_2 and Port0_3, respectively, and the Forwarder may record three pairs, where the three pairs are as follows: a data channel (which may be denoted as data channel 1) and a protocol connection between the Forwarder and the vBRAS1, a data channel (which may be denoted as data channel 2) and a protocol connection between the Forwarder and the vBRAS2, and a data channel (which may be denoted as data channel 3) and a protocol connection between the Forwarder and the vBRAS3. Then the Forwarder may configure that Port0_1 is associated with data channel 1, Port0_2 is associated with data channel 2, and Port0_3 is associated with data channel 3.

In an example of the present disclosure, the Forwarder may record the respective data channels associated with the user access interfaces in an interface identity and data channel identity association table (hereinafter referred to as interface identity-data channel identity association table), where each interface identity-data channel identity association entry may record an identity of a user access interface and an identity of a data channel associated with the user access interface.

Based on this, in the block 302, the Forwarder may determine the data channel associated with the user access interface through the following blocks: determining an interface identity of the user access interface, obtaining an entry from an interface identity-data channel identity association table in the Forwarder, and determining a data channel corresponding to a data channel identity in the obtained entry as the data channel associated with the user access interface. Where, the entry includes the determined interface identity.

In the block 302, after the Forwarder determines the data channel associated with the user access interface, in an example, the forwarding chip of the Forwarder may redirect the received authentication packet to the data channel associated with the user access interface; and in another example, CPU of the Forwarder may redirect the received authentication packet to the data channel associated with the user access interface. In this way, the authentication packet may be transmitted to the vBRAS via the data channel associated with the user access interface.

At block 303, the vBRAS receives the authentication packet from the Forwarder via the data channel.

Here, the vBRAS may record an identity of the data channel via which the authentication packet is received.

At block 304, the vBRAS authenticates the authentication packet, and block 305 is executed when the authentication is successful.

In the present disclosure, the vBRAS may use any technique of a BRAS authenticating a packet that is well known to those skilled in the art to authenticate the authentication packet, which thus will not be redundantly described herein.

At block 305, the vBRAS creates a session entry for instructing the Forwarder to forward a data packet, and transmits the session entry and the identity of the data channel via which the authentication packet is received to the Forwarder through a protocol connection paired with the data channel, so as to control the Forwarder to forward the data packet.

Figure 5:
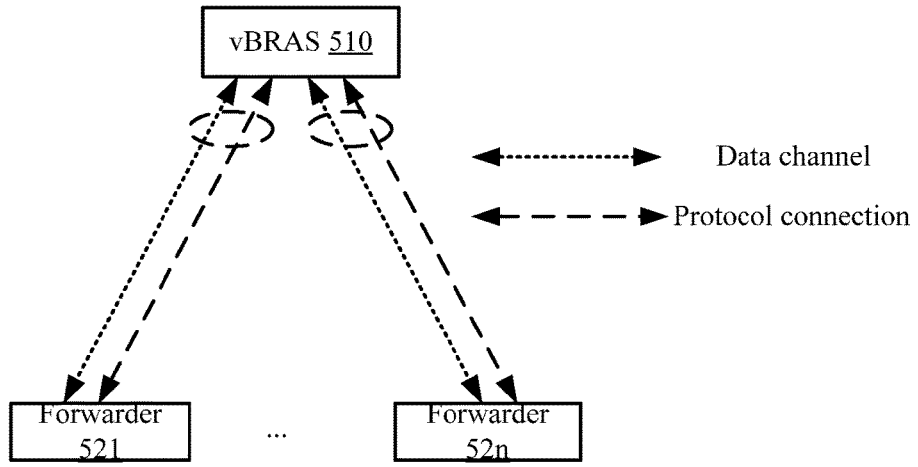
FIG. 5 illustrates a schematic diagram of a vBRAS and a Forwarder according to another example of the present disclosure.

In the present disclosure, one vBRAS may be allowed to control a plurality of Forwarders. FIG. 5 illustrates a schematic diagram of a vBRAS and a Forwarder according to another example of the present disclosure. As shown in FIG. 5, under a precondition that one vBRAS controls a plurality of Forwarders, for example, a vBRAS 510 controls a Forwarder 521, . . . , and a Forwarder 52$n$, where n is an integer greater than 1, vBRAS 510 may establish a data channel and a protocol connection with each of the Forwarders 521-52$n$ to achieve an interaction between each of the Forwarders 521-52$n$ and vBRAS 510. Where the data channel and the protocol connection between vBRAS 510 and each of the Forwarders may be referred to as a pair. The vBRAS 510 may record each pair.

As an example, the vBRAS may record each pair in a data channel identity-protocol connection identity pairing table. For example, each data channel identity-protocol connection identity pairing entry may record an identity of a data channel and an identity of a protocol connection paired with the data channel.

As described above at block 303, after receiving the authentication packet, the vBRAS may record the identity of the data channel via which the authentication packet is received. In this way, when the block 305 is executed, based on the above description that the vBRAS records each pair in the data channel identity-protocol connection identity pairing table, in block 305, the vBRAS may determine the protocol connection paired with the data channel via which the authentication packet is received through the following blocks: obtaining a pairing entry containing the identity of the data channel via which the authentication packet is received in the data channel identity-protocol connection identity pairing table in the vBRAS; and determining a protocol connection corresponding to the protocol connection identity in the obtained pairing entry as the protocol connection paired with the data channel via which the authentication packet is received.

At block 306, the Forwarder receives the session entry and the identity of the data channel from the vBRAS through the protocol connection between the Forwarder and the vBRAS, and creates a forwarding entry matching the user access interface according to the session entry and the identity of the data channel.

In an example of the present disclosure, the forwarding entry created according to the session entry herein may include: a host Forwarding Information Base (FIB) entry and an Address Resolution Protocol (ARP) entry for instructing a packet forwarded from a network side to a user side, and an Internet Protocol over Ethernet (IPoE) session entry for instructing a packet forwarded from the user side to the network side.

As an example, the forwarding entry matching the user access interface may be sent to an interface board to which the user access interface belongs. Afterwards, when the interface board receives a data packet from a user or a data packet transmitted from the network side to a user, the data packet may be forwarded according to the forwarding entry matching the user access interface.

Thus far, the flow shown in FIG. 3 is completed.

It may be seen from the flow shown in FIG. 3 that the forwarding plane and the control plane of the BRAS are separated, and the forwarding plane and the control plane of the BRAS that have been separated are independent of each other. In this way, a contradiction of uncoordinated resources of the control plane and the forwarding plane existing in the BRAS may be solved, so that the forwarding plane and the control plane can play their respective advantages.

The flow shown in FIG. 3 is described below with an example in which a data channel between a vBRAS and a Forwarder is a Virtual eXtensible Local Area Network (VXLAN) tunnel and a protocol connection between the vBRAS and the Forwarder is an Openflow connection.

Figure 6:
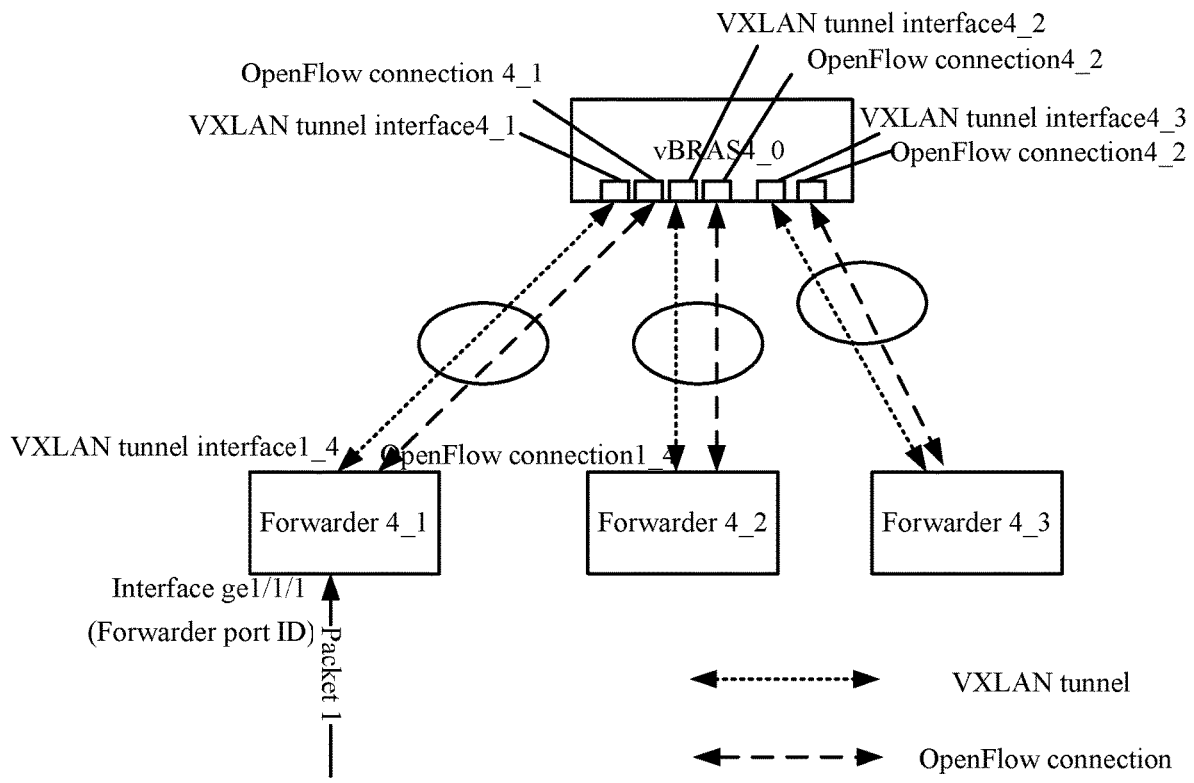
FIG. 6 illustrates a schematic diagram of a network according to an example of the present disclosure.

FIG. 6 illustrates a schematic diagram of a network according to an example of the present disclosure. As shown in FIG. 6, the network includes a vBRAS (denoted as vBRAS4_0). The vBRAS4_0 controls three Forwarders: Forwarder4_1, Forwarder4_2 and Forwarder4_3.

In FIG. 6, Forwarder4_1 may be set as follows:
1) an IP address of Forwarder4_1 is 1.1.1.1;
2) a VXLAN tunnel: a source Internet Protocol (IP) address of the VXLAN tunnel from Forwarder4_1 to vBRAS4_0 is 1.1.1.1, and a destination IP address of the VXLAN tunnel from Forwarder4_1 to vBRAS4_0 is the IP address 2.2.2.2 of vBRAS4_0;
3) a VXLAN tunnel interface: an interface corresponding to the VXLAN tunnel on the Forwarder4_1 is denoted as VXLAN tunnel interface1_4;
4) a user access interface ge1/1/1: it is configured with a Forwarder port ID. To associate user access interface ge1/1/1 with VXLAN tunnel interface1_4, the Forwarder port ID configured for user access interface ge1/1/1 herein is denoted as the VXLAN ID (denoted as VXLAN1) of the VXLAN tunnel;
5) an association between user access interface ge1/1/1 and VXLAN tunnel interface1_4 is recorded in the Forwarder4_1, such that when an authentication packet received from user access interface ge1/1/1 is forwarded via the VXLAN tunnel, a VXLAN ID encapsulated in the authentication packet is the Forwarder port ID (i.e., the VXLAN ID of the VXLAN tunnel) configured for user access interface ge1/1/1;
6) IP address 1.1.1.1 of Forwarder4_1 is specified as one end for the Openflow connection, IP address 2.2.2.2 of vBRAS4_0 is specified as the other end for the Openflow connection, and the Openflow connection is denoted as Openflow connection1_4.

Similarly, Forwarder4_2 and Forwarder4_3 need to be set similarly to Forwarder4_1, which will not be redundantly described herein.

In FIG. 6, vBRAS4_0 may be set as follows:
1) an IP address of vBRAS4_0 is 2.2.2.2;
2) a VXLAN tunnel and a VXLAN tunnel interface;
When a source IP address of the VXLAN tunnel is 2.2.2.2 and a destination IP address of the VXLAN tunnel is the IP address 1.1.1.1 of Forwarder4_1, the VXLAN tunnel is a VXLAN tunnel (denoted as VXLAN tunnel4_1) from vBRAS4_0 to Forwarder4_1, and the tunnel interface corresponding to VXLAN tunnel4_1 on vBRAS4_0 is denoted as VXLAN tunnel interface4_1; and VXLAN tunnel4_1 and the VXLAN tunnel from Forwarder4_1 to vBRAS4_0 are the same tunnel of different directions.

When a source IP address of the VXLAN tunnel is 2.2.2.2 and the destination IP address of the VXLAN tunnel is the IP address (denoted as 3.3.3.3) of Forwarder4_2, the VXLAN tunnel is the VXLAN tunnel (denoted as VXLAN tunnel4_2) from vBRAS4_0 to Forwarder4_2, and the tunnel interface corresponding to VXLAN tunnel4_2 on vBRAS4_0 is denoted as VXLAN tunnel interface4_2; and VXLAN tunnel4_2 and the above VXLAN tunnel from Forwarder4_2 to vBRAS4_0 are the same tunnel of different directions.

When a source IP address of the VXLAN tunnel is 2.2.2.2 and the destination IP address of the VXLAN tunnel is the IP address (denoted as 4.4.4.4) of the Forwarder4_3, the VXLAN tunnel is the VXLAN tunnel (denoted as VXLAN tunnel4_3) from vBRAS4_0 to Forwarder4_3, and the tunnel interface corresponding to VXLAN tunnel4_3 on vBRAS4_0 is denoted as VXLAN tunnel interface 4_3; and VXLAN tunnel4_3 and the above VXLAN tunnel from Forwarder4_3 to vBRAS4_0 are the same tunnel of different directions.

In this example, VXLAN ID corresponding to VXLAN tunnel interface4_1 is the VXLAN ID of VXLAN tunnel4_1; VXLAN ID corresponding to VXLAN tunnel interface4_2 is the VXLAN ID of VXLAN tunnel4_2, and VXLAN ID corresponding to VXLAN tunnel interface4_3 is the VXLAN ID of VXLAN tunnel4_3. Based on the above descriptions, a Forwarder port ID configured for a user access interface is VXLAN ID of a corresponding VXLAN tunnel, and a VXLAN tunnel interface on vBRAS4_0 may be correspond to a user access interface on a Forwarder controlled by the vBRAS4_0 through VXLAN ID corresponding to the VXLAN tunnel interface.

In this example, IPOE users connected to Forwarders may access the BRAS via the VXLAN tunnel interface4_1 to the VXLAN tunnel interface4_3.

3) IP address 2.2.2.2 of vBRAS4_0 is specified as the other end of an Openflow connection and IP address 1.1.1.1 of Forwarder4_1 is specified as one end for the Openflow connection, where the Openflow connection is denoted as Openflow connection4_1, which is paired with the above VXLAN tunnel 4_1 and recorded in the vBRAS4_0;

IP address 2.2.2.2 of vBRAS4_0 is specified as the other end of an Openflow connection and IP address 3.3.3.3 of Forwarder4_2 is specified as one end for the Openflow connection, where the Openflow connection is denoted as Openflow connection4_2, which is paired with the above VXLAN tunnel 4_2 and recorded in the vBRAS4_0;

IP address 2.2.2.2 of vBRAS4_0 is specified as the other end of an Openflow connection and IP address 4.4.4.4 of Forwarder4_3 is specified as one end for the Openflow connection, where the Openflow connection is denoted as Openflow connection4_3, which is paired with the above VXLAN tunnel 4_3 and recorded in the vBRAS4_0.

Based on the above configurations, interactions of vBRAS4_0 with three Forwarders (Forwarder4_1, Forwarder4_2 and Forwarder4_3) are as shown in FIG. 6.

A process that an IPoE Dynamic Host Configuration Protocol (DHCP) packet triggers a user to get online is described below for example.

Forwarder4_1 receives the DHCP packet via the user access interface ge1/1/1. For convenience of description, the DHCP packet herein is denoted as packet1.

Forwarder4_1 performs a VXLAN encapsulation on the packet1. During the VXLAN encapsulation, VXLAN ID is the Forwarder port ID (denoted as VXLAN1) of the user access interface ge1/1/1. For convenience of description, the packet1 after the VXLAN encapsulation is denoted as packet2.

Forwarder4_1 redirects the packet2 to VXLAN tunnel interface1_4 according to a recorded association between user access interface ge1/1/1 and VXLAN tunnel interface1_4, and transmits the packet2 to vBRAS4_0.

The vBRAS4_0 receives the packet2 via the VXLAN tunnel interface4_1.

The vBRAS4_0 records the VXLAN tunnel interface4_1 via which the packet2 is received.

The vBRAS4_0 performs a VXLAN decapsulation on the packet2 to recover the packet1.

The vBRAS4_0 authenticates the packet1 (i.e., processing of a user getting online). When the authentication is successful, the vBRAS4_0 creates a session entry. Here, as shown in Table 1, the session entry may include:

TABLE 1

User's Internet Protocol (IP) address
User Identity (ID)
Virtual Routing Forwarding (VRF) index
QinQ's inner-layer VLAN ID
QinQ's outer-layer VLAN ID TABLE 1-continued Subnet mask length of User IP
User's Media Access Control (MAC) address The vBRAS4_0 determines VXLAN ID corresponding to the VXLAN tunnel interface4_1 as the VXLAN1 according to the recorded VXLAN tunnel interface4_1 via which the packet2 is received.

The vBRAS4_0 determines VXLAN tunnel4_1 according to the determined VXLAN ID (VXLAN1).

The vBRAS4_0 transmits a session entry and the determined VXLAN ID (VXLAN1) to Forwarder4_1 through Openflow connection4_1 paired with VXLAN tunnel interface4_1.

The Forwarder4_1 receives the session entry and the VXLAN ID (VXLAN1) from the Openflow connection1_4.

The Forwarder4_1 obtains the user access interface ge1/1/1 with the Forwarder port ID equal to the VXLAN ID (VXLAN1) according to the VXLAN ID (VXLAN1), and then creates a forwarding entry according to the session entry and sends the forwarding entry to an interface board accessed by the user access interface ge1/1/1, where the forwarding entry includes a host FIB and an ARP entry for instructing a packet forwarded from the network side to the user side, and an IPoE session entry for instructing a packet forwarded from the user side to the network side. Afterwards, a data packet received by the user access interface ge1/1/1 may be forwarded according to the forwarding entry.

Thus far, the description of the above example is completed.

In the present disclosure, when receiving a session entry sent by the vBRAS, the Forwarder may record the vBRAS. Afterwards, the Forwarder may monitor traffic statistics (e.g., traffic statistic associated with the session entry) in a session corresponding to the session entry in real time, and report a traffic statistical result through the protocol connection between the Forwarder and the vBRAS. The vBRAS may receive the traffic statistical result reported by the Forwarder, through the protocol connection.

In the present disclosure, a network segment route of a vBRAS address pool may be issued by a Forwarder to guide user's traffic to the Forwarder. Although the present disclosure allows one vBRAS to control a plurality of Forwarders, the network segment of the vBRAS address pool cannot be shared by different Forwarders, and one network segment can be used only by one Forwarder. The following two principles may be applied when a network segment is assigned to a Forwarder:

1) The vBRAS sends a network segment assigned to the Forwarder through a protocol connection for example, an Openflow connection to the Forwarder. The Forwarder records the network segment into a route table and then externally issues a corresponding network segment route through a route protocol.

2) For a user accessing from the Forwarder, a DHCP server assigns an IP address only from the network segment corresponding to the Forwarder to the user.

It is noted that the BRAS mainly provides two access services at present: PPPoX and IPoX, where the PPPoX access refers to an access by a user via PPP dial, and the IPoX access refers to an access triggered by a DHCP packet, an IP packet or the like. The IPOE is a common access manner in the IPoX. PPP over Ethernet (PPPoE) is a common access manner in the PPPoX. The examples provided in the present disclosure may support the two access services of the BRAS as described above.

Figure 7:
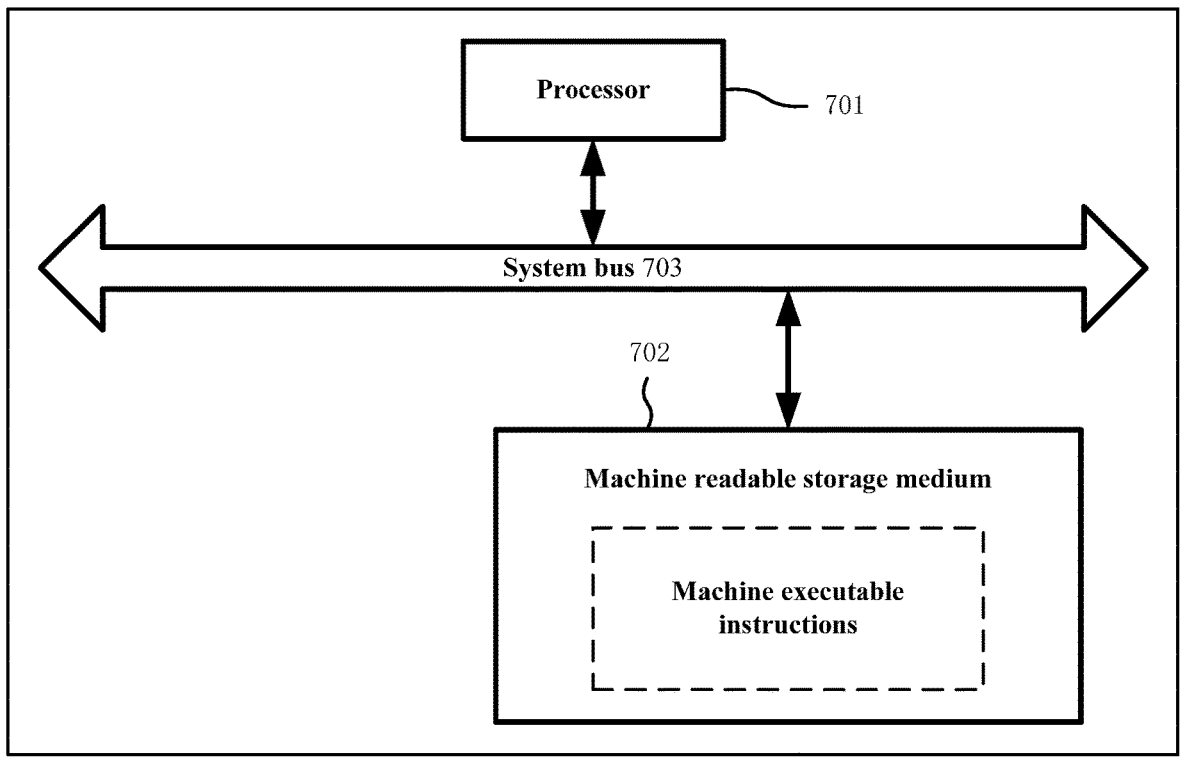
FIG. 7 illustrates a schematic diagram of a hardware structure of a server according to an example of the present disclosure.

FIG. 7 illustrates a schematic diagram of a hardware structure of a server according to an example of the present disclosure. The server enables the BRAS control plane function. The server may include a processor 701 and a machine readable storage medium 702. The processor 701 and the machine readable storage medium 702 may communicate with each other via a system bus 703. Also, the processor 701 may execute the method of separating a control plane function and a forwarding plane function of a BRAS as described above by reading and executing machine executable instructions corresponding to a logic of separating a control plane function and a forwarding plane function of a BRAS stored in the machine readable storage medium 702.

The machine readable storage medium 702 described herein may be any electronic, magnetic, optical or other physical storage device, and may contain or store information, such as executable instructions, data and the like. For example, the machine readable storage medium may be a Random Access Memory (RAM), a volatile memory, a nonvolatile memory, a flash memory, a storage drive (e.g., hard disk drive), a solid state hard disk, any type of storage disk (e.g., optical disk, Digital Video Disk (DVD)), or a similar storage medium, or a combination thereof.

Figure 8:
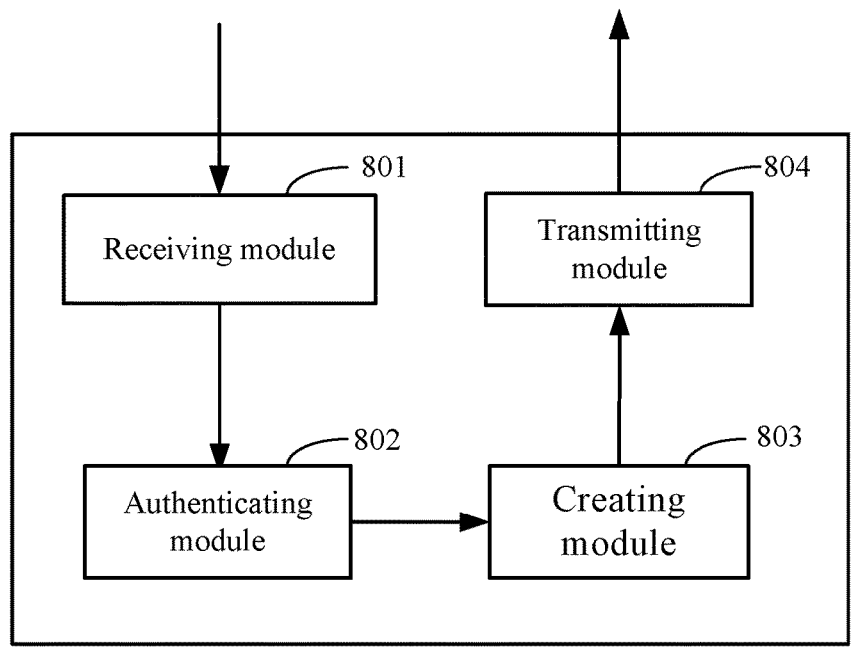
FIG. 8 illustrates a function module diagram of a logic of separating a control plane function and a forwarding plane function of a BRAS according to an example of the present disclosure.

FIG. 8 illustrates a function module diagram of a logic of separating a control plane function and a forwarding plane function of a BRAS according to an example of the present disclosure. Functionally, the logic may include a receiving module 801, an authenticating module 802, a creating module 803, and a transmitting module 804.

The receiving module 801 may be configured to receive an authentication packet from a Forwarder via a data channel, where the Forwarder enables a BRAS forwarding plane function.

The authenticating module 802 may be configured to authenticate the authentication packet.

The creating module 803 may be configured to create a session entry for instructing the Forwarder to forward a data packet when the authentication of the authenticating module 802 on the authentication packet is successful.

The transmitting module 804 may be configured to transmit the session entry and an identity of the data channel to the Forwarder through a protocol connection paired with the data channel, so as to control the Forwarder to forward the data packet.

In an example, the transmitting module 804 may determine the protocol connection paired with the data channel through the following blocks:
obtaining a pairing entry from a data channel identity and protocol connection identity pairing table in the server, wherein the pairing entry includes the identity of the data channel; and
determining a protocol connection corresponding to a protocol connection identity in the obtained pairing entry as the protocol connection paired with the data channel.

In an example, the transmitting module 804 may further transmit a protocol packet to the Forwarder via the data channel, and the receiving module 801 may further receive a protocol packet from the Forwarder via the data channel. The protocol packet includes but not limited to an ARP packet and a DHCP packet.

In an example, the transmitting module 804 may further receive a traffic statistical result through the protocol connection, where the traffic statistical result is reported by the Forwarder and associated with the session entry.

According to an example of the present disclosure, there is also provided a machine readable storage medium including machine executable instructions, for example, the machine readable storage medium 702 in FIG. 7. The machine executable instructions may be executed by the processor 701 in the server to implement the method of separating a control plane function and a forwarding plane function of a BRAS as described above.

Figure 9:
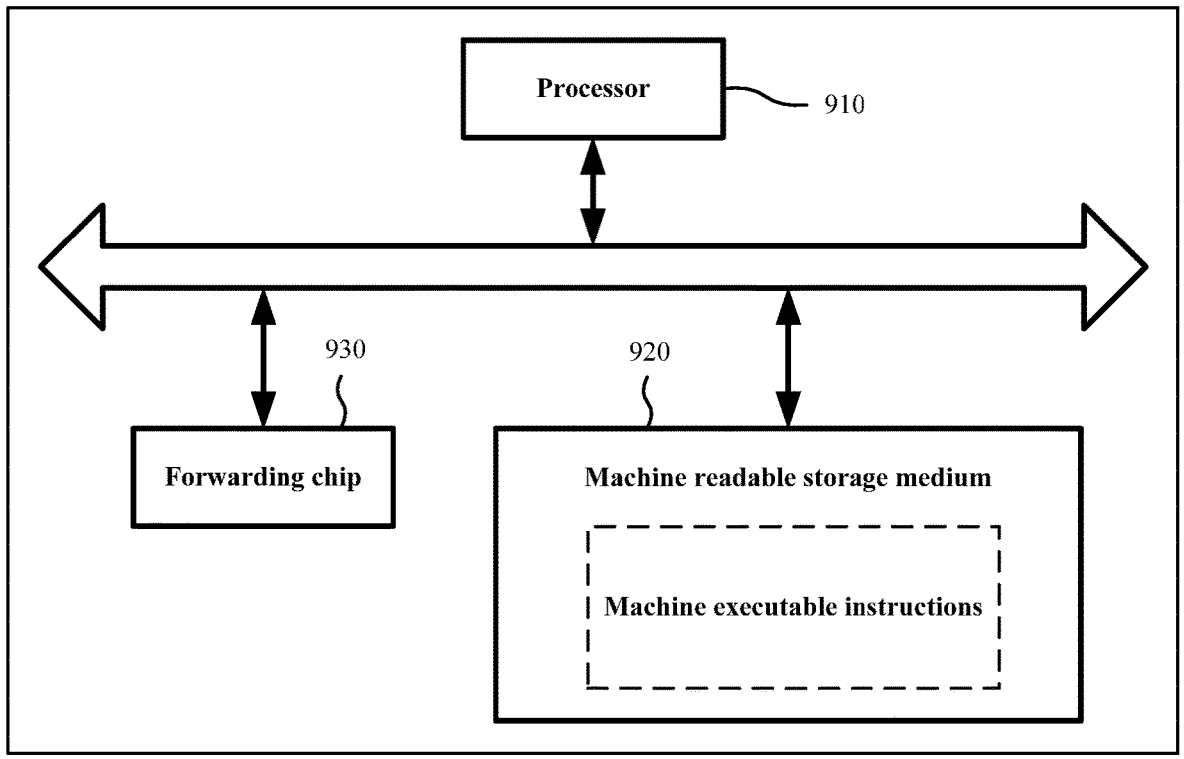
FIG. 9 illustrates a schematic diagram of a hardware structure of a Forwarder according to an example of the present disclosure.

FIG. 9 illustrates a hardware structure diagram of a Forwarder according to an example of the present disclosure. The Forwarder enables a BRAS forwarding plane. The Forwarder may include a processor 910, a machine readable storage medium 920, and forwarding chip 930. The forwarding chip 930 may be configured to receive an authentication packet via a local user access interface, redirect the authentication packet to a data channel associated with the user access interface and transmit the authentication packet to a server via the data channel. By reading and executing machine executable instructions stored in the machine readable storage medium 920, the processor 910 is caused to receive a session entry and an identity of the data channel associated with the user access interface transmitted from the server via a protocol connection between the Forwarder and the server, and create a forwarding entry matching the user access interface according to the session entry and the identity of the data channel. Where, the server enables a BRAS control plane function.

In an example, when determining the data channel associated with the user access interface, the processor 910 is caused by the machine executable instructions to determine an interface identity of the user access interface, obtain an entry from an interface identity-data channel identity association table in the Forwarder, and determine a data channel corresponding to a data channel identity in the obtained entry as the data channel associated with the user access interface. Where, the entry includes the determined interface identity.

In an example, the processor 910 is further caused by the machine executable instructions to report a traffic statistical result associated with the session entry to the server through the protocol connection.

In an example, when the forwarding chip 930 is out of work, the processor 910 is caused by the machine executable instructions to redirect the authentication packet to a data channel associated with the user access interface.

Figure 10:
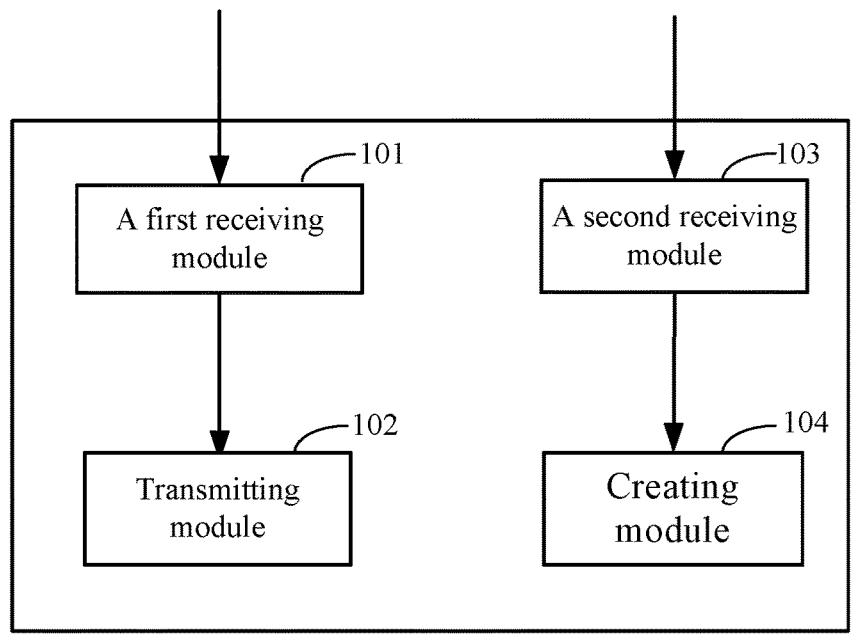
FIG. 10 illustrates a schematic diagram of a structure of a Forwarder according to an example of the present disclosure.

FIG. 10 illustrates a structure diagram of a Forwarder according to another example of the present disclosure. As shown in FIG. 10, the Forwarder may include a first receiving module 101, a transmitting module 102, a second receiving module 103, and a creating module 104.

The first receiving module 101 may be configured to receive an authentication packet via a user access interface of the Forwarder.

The transmitting module 102 may be configured to transmit the authentication packet to a server via a data channel associated with the user access interface, where the server enables a BRAS control plane function.

The second receiving module 103 may be configured to receive a session entry and an identity of the data channel associated with the user access interface transmitted from the server via a protocol connection between the Forwarder and the server.

The creating module 104 may be configured to create a forwarding entry matching the user access interface according to the session entry and the identity of the data channel.

In an example, the transmitting module 102 determines the data channel associated with the user access interface through the following blocks: determining an interface identity of the user access interface, obtaining from an interface identity-data channel identity association table, and determining a data channel corresponding to a data channel identity in the obtained entry as the data channel associated with the user access interface. Where, the entry includes the determined interface identity.

In an example, the transmitting module 102 may further report a traffic statistical result associated with the session entry through the protocol connection.

The above are just descriptions of the examples of the present disclosure and not intended to limit the present disclosure. Any variations, equivalent substitutions, modifications and the like made within the spirit and principle of the present disclosure should all be encompassed within the scope of protection of the present disclosure.

The invention claimed is:

1. A method of separating a control plane function and a forwarding plane function of a Broadband Remote Access Server (BRAS), comprising:
   receiving, by a server, an authentication packet from a Forwarder among a plurality of Forwarders via a data channel associated with a user access interface of the Forwarder, wherein the server enables a BRAS control plane function and each of the plurality of Forwarders enables a respective BRAS forwarding plane function, and wherein the Forwarder redirects the authentication packet received through the user access interface to the data channel;
   authenticating, by the server, the authentication packet; and
   when the authentication is successful, creating, by the server, a session entry for instructing the Forwarder to forward a data packet, and transmitting, by the server, the session entry and an identity of the data channel to the Forwarder through a protocol connection paired with the data channel,
   wherein the server is configured to establish a respective different pair of a data channel and a protocol connection with each of the plurality of Forwarders, and store, in the pairing table, a corresponding pairing entry for each of the respective different pairs, and
   wherein the server is configured to obtain a pairing entry from the pairing table in the server and, based on the pairing entry, determine the protocol connection paired with the data channel for the transmission.

2. The method according to claim 1, further comprising: transmitting, by the server, a protocol packet to the Forwarder via the data channel; and receiving, by the server, a protocol packet from the Forwarder via the data channel.

3. The method according to claim 1, further comprising: receiving, by the server, a traffic statistical result through the protocol connection, wherein the traffic statistical result is reported by the Forwarder and associated with the session entry.

4. A method of separating a control plane function and a forwarding plane function of a Broadband Remote Access Server (BRAS), comprising:
   receiving, by a Forwarder, an authentication packet via a user access interface of the Forwarder, wherein the Forwarder enables a BRAS forwarding plane function;
   redirecting, by the Forwarder, the authentication packet to a server among a plurality of servers via a data channel associated with the user access interface and transmitting the authentication packet to the server via the data channel, wherein each of the plurality of servers enables a respective BRAS control plane function;
   receiving, by the Forwarder, a session entry and an identity of the data channel associated with the user access interface from the server via a protocol connection between the Forwarder and the server; and
   creating, by the Forwarder in order to forward a data packet, a forwarding entry matching the user access interface according to the session entry and the identity of the data channel,
   wherein the server is configured to obtain a pairing entry from a pairing table in the server and, based on the pairing entry, determine the protocol connection for transmitting the session entry and the identity of the data channel to the Forwarder, and
   wherein each of the plurality of servers is configured to establish a respective different pair of a data channel and a protocol connection with the Forwarder, and store, in a respective pairing table, a corresponding pairing entry for the respective pair.

5. The method according to claim 4, further comprising: determining, by the Forwarder, an interface identity of the user access interface; obtaining, by the Forwarder, an entry from an interface identity-data channel identity association table in the Forwarder, wherein, the entry includes the determined interface identity; and determining, by the Forwarder, a data channel corresponding to a data channel identity in the obtained entry as the data channel associated with the user access interface.

6. The method according to claim 4, further comprising: reporting, by the Forwarder, a traffic statistical result associated with the session entry to the server through the protocol connection.

7. A server, comprising: a processor, and a machine readable storage medium, wherein the machine readable storage medium stores machine executable instructions that can be executed by the processor, and the processor is caused by the machine executable instructions to perform the method of separating a control plane function and a forwarding plane function of a Broadband Remote Access Server (BRAS) described in claim 1.

8. The server according to claim 7, wherein the processor is further caused by the machine executable instructions to: transmit a protocol packet to the Forwarder via the data channel; and receive a protocol packet from the Forwarder via the data channel.

9. The server according to claim 7, wherein the processor is further caused by the machine executable instructions to: receive a traffic statistical result through the protocol connection, wherein the traffic statistical result is reported by the Forwarder and associated with the session entry.

10. A Forwarder enabling a Broadband Remote Access Server (BRAS) forwarding plane function, comprising:
    a forwarding chip, configured to receive an authentication packet via a user access interface of the Forwarder, redirect the authentication packet to a data channel associated with the user access interface, and transmit the authentication packet to a server among a plurality of servers via the data channel, wherein each of the plurality of servers enables a respective BRAS control plane function;
    a processor; and a machine readable storage medium, wherein, by reading and executing machine executable instructions stored in the machine readable storage medium, the processor is caused to:
    receive a session entry and an identity of the data channel associated with the user access interface from the server via a protocol connection between the Forwarder and the server, and create a forwarding entry matching the user access interface according to the session entry and the identity of the data channel, wherein the server is configured to obtain a pairing entry from a pairing table in the server and, based on the pairing entry, determine the protocol connection for transmitting the session entry and the identity of the data channel to the Forwarder, and wherein each of the plurality of servers is configured to establish a respective different pair of a data channel and a protocol connection with the Forwarder, and store, in a respective pairing table, a corresponding pairing entry for the respective pair.

11. The Forwarder according to claim 10, wherein, the processor is further caused by the machine executable instructions to: determine an interface identity of the user access interface; obtain an entry from an interface identity-data channel identity association table in the Forwarder, wherein, the entry includes the determined interface identity; and determine a data channel corresponding to a data channel identity in the obtained entry as the data channel associated with the user access interface.

12. The Forwarder according to claim 10, wherein, the processor is further caused by the machine executable instructions to: report a traffic statistical result associated with the session entry to the server through the protocol connection.

13. The Forwarder according to claim 10, wherein, when the forwarding chip is out of work, the processor is caused by the machine executable instructions to:

redirect the authentication packet to the data channel associated with the user access interface.

* * * * *